United States Patent [19]
Bade et al.

[11] Patent Number: 5,407,282
[45] Date of Patent: Apr. 18, 1995

[54] SINGLE-TRUST BEARING

[75] Inventors: Karl-Heinz Bade, Mörlenbach; Michael Schütz, Rimbach, both of Germany

[73] Assignee: Firma Carl Freudenberg, Weinheim, Germany

[21] Appl. No.: 115,953

[22] Filed: Sep. 1, 1993

[30] Foreign Application Priority Data
Sep. 4, 1992 [DE] Germany .................. 42 29 613.7

[51] Int. Cl.⁶ ............................................. F16C 21/00
[52] U.S. Cl. ................................. 384/126; 384/536; 384/582; 384/611
[58] Field of Search ............... 384/126, 536, 582, 537, 384/611, 617, 620

[56] References Cited
U.S. PATENT DOCUMENTS 3,704,922 12/1972 Kleinschmidt et al. ............ 384/582
4,542,996 9/1985 Brissette et al. ..................... 384/536
5,314,255 5/1994 Schwerdt ............................ 384/536

FOREIGN PATENT DOCUMENTS
2061625 6/1972 France .

*Primary Examiner*—Lenard A. Footland
*Attorney, Agent, or Firm*—Kenyon & Kenyon

[57] ABSTRACT

A single-thrust bearing is disclosed. The bearing includes a rolling-contact bearing having an inner ring and an outer ring, as well as a thrust ring concentrically surrounding the outer ring of the rolling-contact bearing with radial clearance. The outer ring and the thrust ring are braced against one another by an intermediate ring of rubber-elastic material that is formed by at least two web members, which are distributed in the circumferential direction and are separated by a circumferential clearance. The design of the web members is such that they are inclined with an involute shape in the same direction of rotation.

15 Claims, 5 Drawing Sheets

SINGLE-TRUST BEARING

BACKGROUND OF THE INVENTION

The invention relates generally to a single-thrust bearing of the type comprising a rolling-contact bearing having an inner ring and an outer ring, as well as a thrust ring surrounding the outer ring with radial clearance. In bearings of this type, the outer ring and the thrust ring are braced against one another by an intermediate ring of rubber-elastic material. The intermediate ring is formed by at least two web members, which are distributed in the circumferential direction and are separated by a circumferential clearance. One example of this general type bearing is set forth in U.S. application Ser. No. 08/078,130, which was filed on Jun. 16, 1993 and which is assigned to the assignee of the instant application.

Another example of such a bearing is disclosed by the German Provisional Patent 20 61 625. This previously disclosed bearing is applied as an intermediate bearing for the cardan shaft of motor vehicles, whereby the intermediate ring is formed by several web members of rubber-elastic material, which are uniformly distributed in the circumferential direction. The web members extend between the outer ring and the thrust ring in the radial direction. However, the working properties of such bearings are not sufficiently satisfactory over a long service life. Following the manufacturing process and during normal operational use, tensile and shearing stresses, which reduce service life, occur within the web members, particularly in the area of the radially inner and outer supporting surfaces. These stresses can lead to premature wear and tear, and consequently cause the bearing to fail.

There remains a need to further develop bearings of the previously disclosed type so as to reliably avoid service-life-reducing shearing and tensile forces within the rubber-elastic intermediate ring and to achieve improved working properties for the bearing over a prolonged service life. Furthermore, there remains a need for such bearings that can be assembled by employing fewer component parts.

SUMMARY OF THE INVENTION

The invention meets these needs by providing a bearing that comprises an inner bearing having an outer support surface about which is arranged at a radial offset to a concentric thrust ring. The thrust ring and inner bearing are linked by a series of web members formed of a rubber-elastic material. The lateral sides of these web members have the general profile of an involute.

To avoid shearing and tensile forces within the rubber-elastic intermediate ring, the web members are configured to be inclined with an involute shape in the same direction of rotation. The tensile stresses caused by manufacturing, which adversely influence the rubber-elastic materials by reducing service life, are reliably avoided with this refinement. Any shrinkage of the involute web members that might result from the vulcanization process during manufacturing will not cause tensile stresses, as it would when the web members are arranged in the radial direction, but rather brings about a twisting of the outer ring and the thrust ring relative to one another.

The single-thrust bearing also provides excellent working properties during normal operational use. In particular, the region of the supporting surfaces, where the rubber-elastic web members are affixed to the radially adjacent rings, are mechanically highly stressed when web members extend in the radial direction. However, when the web members are designed with an involute shape, a much more advantageous load distribution results, so that substantially improved working properties are achieved over a longer service life.

By using few parts, the bearing is cheaper to produce. To this end, the web members can have radially inner and outer supporting surfaces, whereby the inner supporting surfaces are adhesively connected to the surface area of the outer ring, and the outer supporting surfaces to the inner-circumferential surface of the thrust ring. As a result, one can dispense with the application of additional thrust and reinforcement rings.

With respect to ease of manufacture and assembly of the single-thrust bearing, it has proven to be advantageous for adjacent web members to be designed to blend into one another in the area of their inner and outer supporting surfaces (FIG. 2B) and to be uniformly distributed in the circumferential direction. On the side of the thrust ring facing the outer ring of the rolling-contact bearing, the thrust ring can have at least one perforation, which is penetrated by the material of the intermediate ring, whereby the material of the intermediate ring blends into one another on the side of the perforation facing away from the web members. In this case, it is advantageous that there is a secure mechanical localization of the intermediate ring on the thrust ring, which is also retained without any change over a long service life.

The circumferential clearance formed by the adjacent web members can essentially correspond to the thickness of the individual web members in the circumferential direction. This refinement further simplifies production of the single-thrust bearing.

To prevent the web members from being subjected to excessive mechanical stresses, at least one of the facing opposed surfaces of adjacent web members can be provided with a non-planar surface such as is provided by protuberances (FIG. 2C). Protuberances can be formed, for example, as stop knobs which protrude in the direction of the opposing surface or by stop ribs which run in the direction of release from the mold. This refinement prevents impact noises which can otherwise arise in the absence of such protuberances from the surfaces, where the thrust rings experience extreme deflection movements relative to the rolling-contact bearing, which would cause the adjacent surfaces to strike against one another. Furthermore, it is advantageous that large radial and circumferentially directed displacements of the rolling-contact bearing and of the thrust bearing relative to one another be limited by the protuberances arranged on the surfaces, whereby the protuberances in the direction of the opposite stop face preferably have a tapered cross-section, to effect a limit-position damping when the protuberances come into contact with the opposite stop face.

The thrust ring can essentially have an L-shaped profile, be designed as a fastening element, and be provided in the region of its radial side with at least one fastening perforation. One can thus dispense with the use of secondary fastening elements. As a result, the entire single-thrust bearing consists of only a few component parts and has a low weight.

BRIEF DESCRIPTION OF THE DRAWINGS

Those and other features, aspects and advantages of the present invention will become better understood with regard to the following description, appended claims and drawings. The accompanying drawings show the individual components in diagrammatic form.

DETAILED DESCRIPTION

Figure 1:
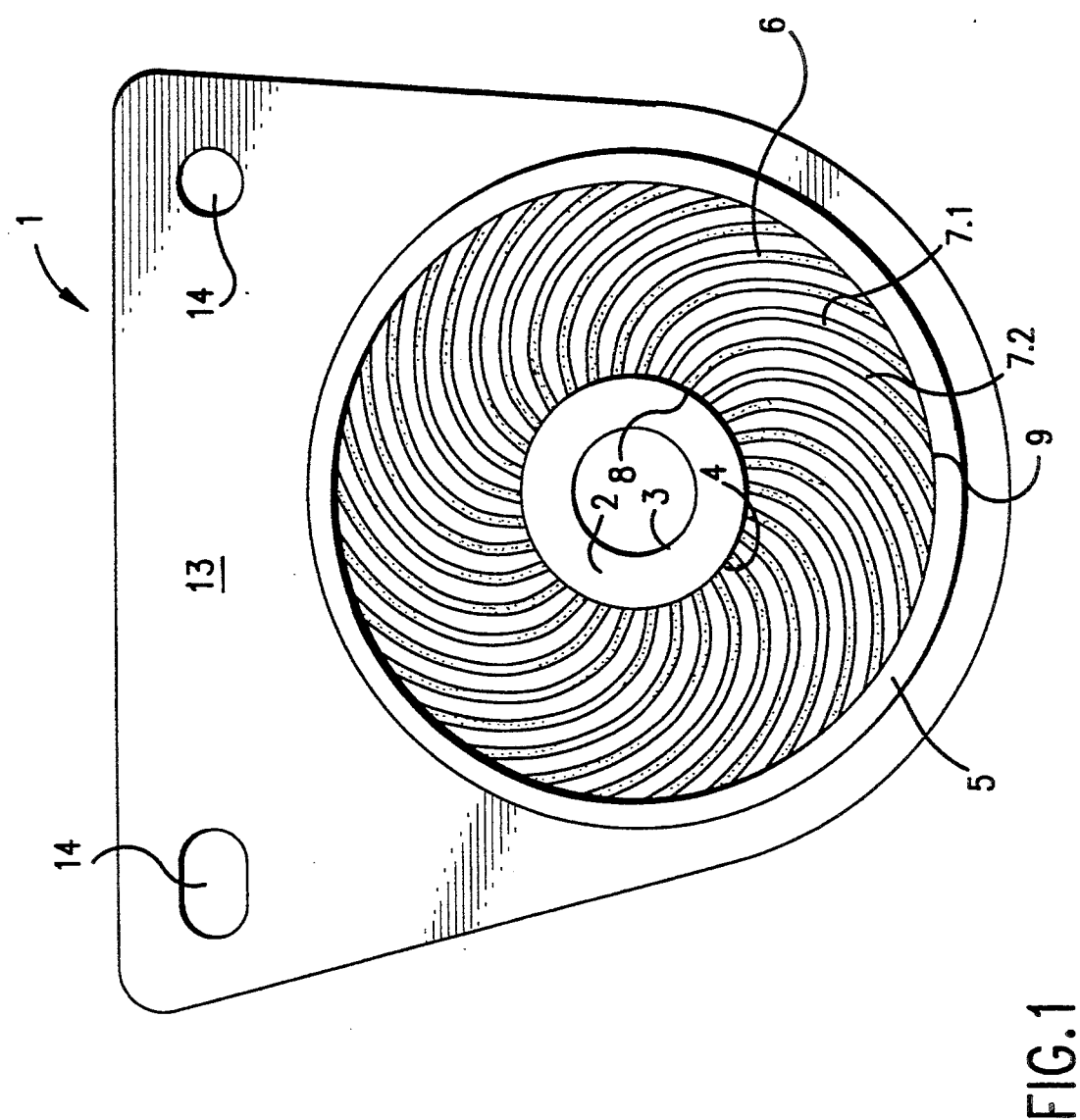
FIG. 1 is a front view of an embodiment of the single-thrust bearing constructed according to the principles of the invention, in which the rubber-elastic intermediate ring is depicted in cut-away view.
Figure 2A:
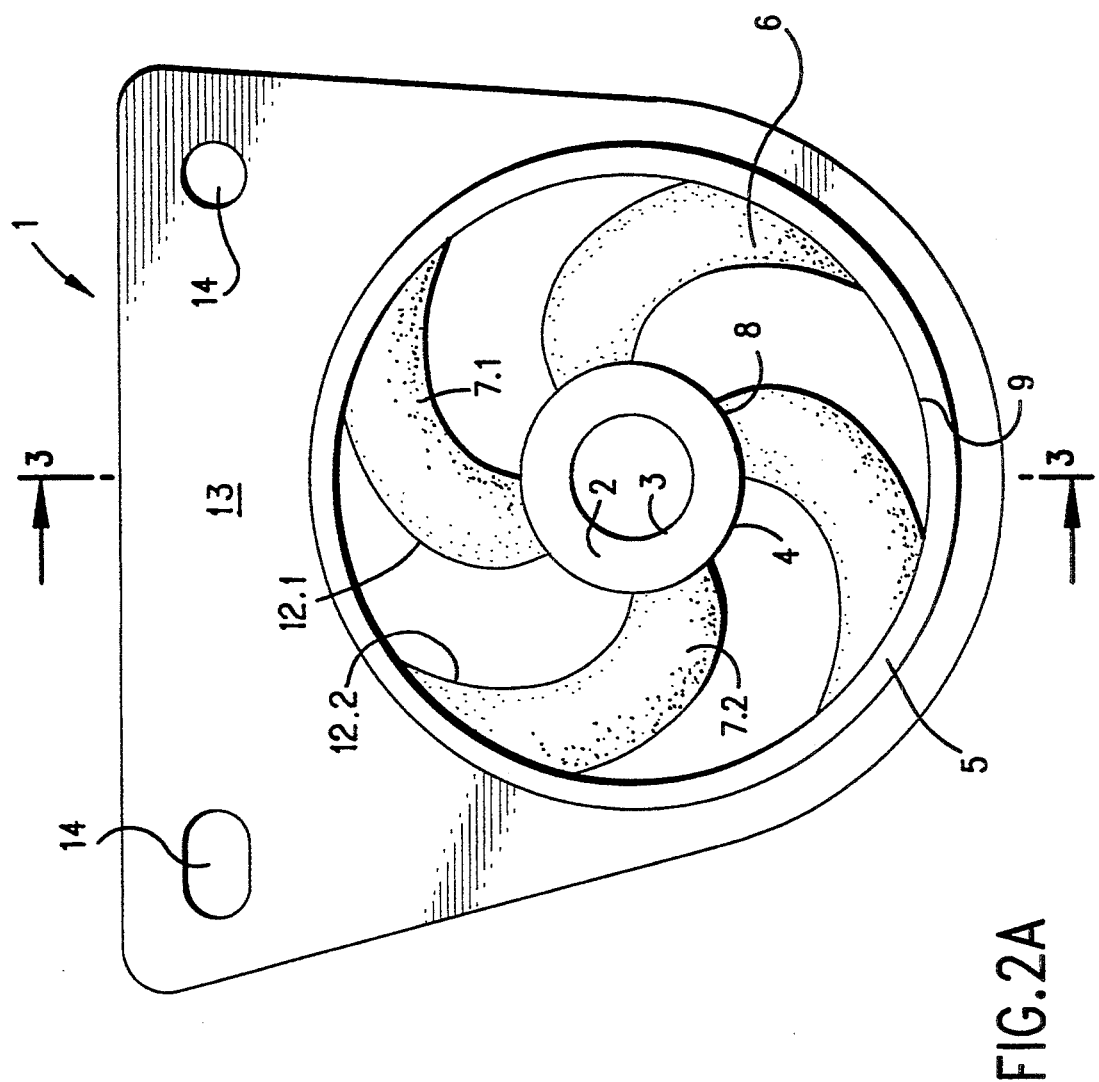
FIG. 2A shows a second embodiment of the single-thrust bearing, in which the rubber-elastic intermediate ring is depicted in a cut-away view.

The embodiments shown in FIGS. 1 and 2A each show a single-thrust bearing 1, which comprises a rolling-contact bearing 2 having an inner ring 3 and an outer ring 4. The outer ring 4 and the thrust ring 5 are braced against one another by an intermediate ring 6 made of a rubber-elastic material. The intermediate ring 6 is made up of a series of web members 7.1 and 7.2 etc. that are uniformly distributed in the circumferential direction, and whose design is such that they are inclined with an involute shape in the same direction of rotation. In these embodiments, the inner and outer supporting surfaces 8 and 9 of the web members 7.1, 7.2 are prevulcanized onto the adjacent surfaces of the outer ring 4 and the thrust ring 5. The thrust ring 5 is designed as a fastening element and has two fastening perforations 14 in the region of its radial side 13. The inner supporting surfaces 8 of the web members 7.1, 7.2 are prevulcanized onto the surface area 10 of the outer ring 4, while the outer supporting surfaces 9 are adhesively joined to the inner circumferential surface 11 of the thrust ring.

In FIG. 1, the intermediate ring 6 is provided with a plurality of web members 7.1, 7.2, whereby the extent of the circumferential gap formed by the adjacent web members corresponds approximately to the thickness of the individual web members. A single-thrust bearing 1 designed in this manner demonstrates very good working properties over a long service life, since the mechanical stresses acting on the supporting surfaces 8, 9 of the web members 7.1, 7.2 are restricted to a minimum during relative displacements in the radial and in the circumferential directions.

While it is made of the same material as the intermediate ring 6, the single-thrust bearing of FIG. 2A has a comparatively higher load carrying capacity and is relatively easier to produce due to the reduced number of web members 7.1, 7.2. In this embodiment, four web members are used. However, it is equally possible to have 2, 3, 5 or any other number of web members.

In the embodiments according to FIGS. 1 and 2, the thrust ring 5 has an L-shaped design and is provided in the region of its radial side 13 with two fastening perforations 14.

Figure 2B:
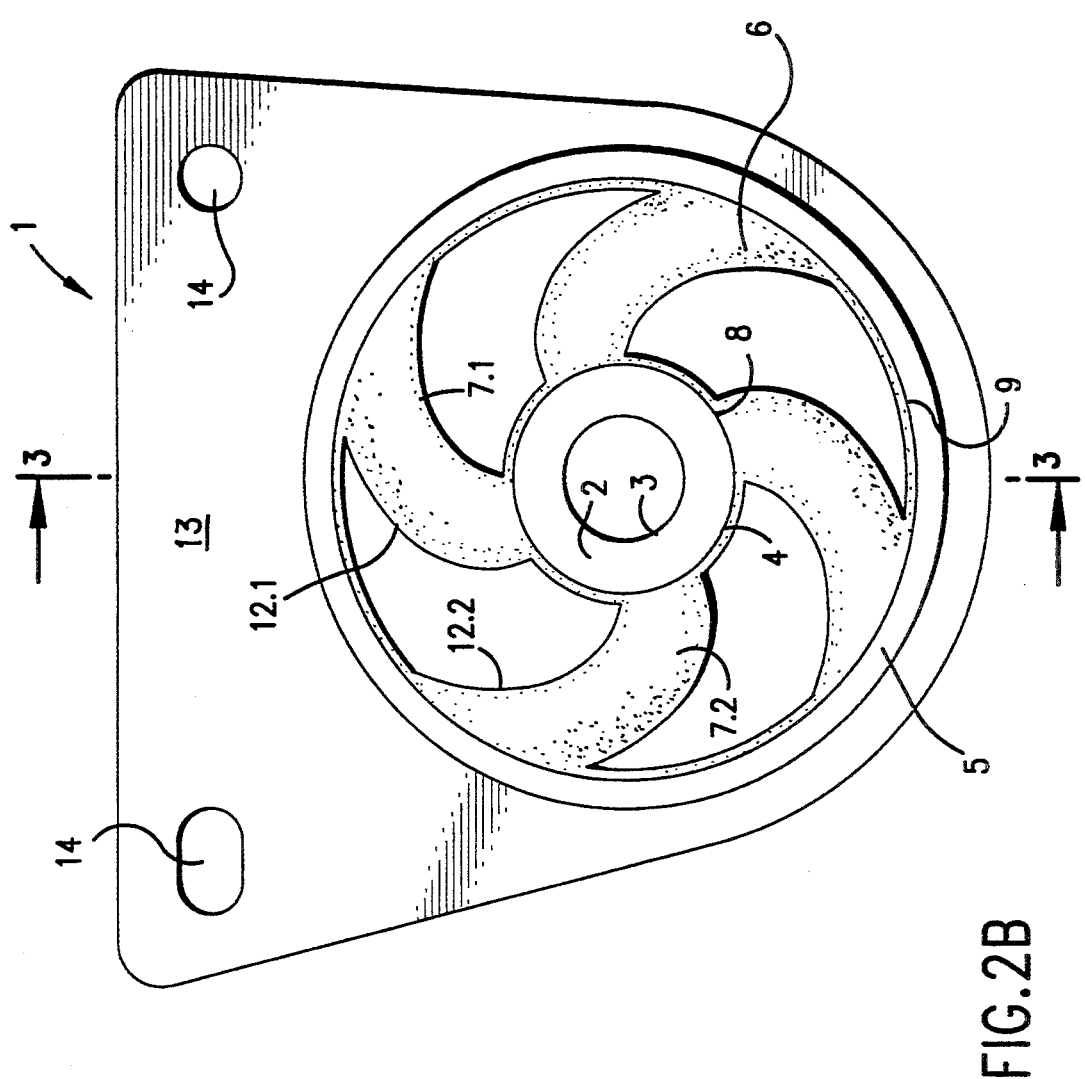
FIG. 2B shows an additional embodiment similar to that shown in FIG. 2A in which the web members blend into one another along the circumferential direction.

FIG. 2B illustrates a variation of this embodiment in which adjacent web members are designed to blend into one another in the area of their inner and outer supporting surfaces and to be uniformly distributed in the circumferential direction.

Figure 2C:
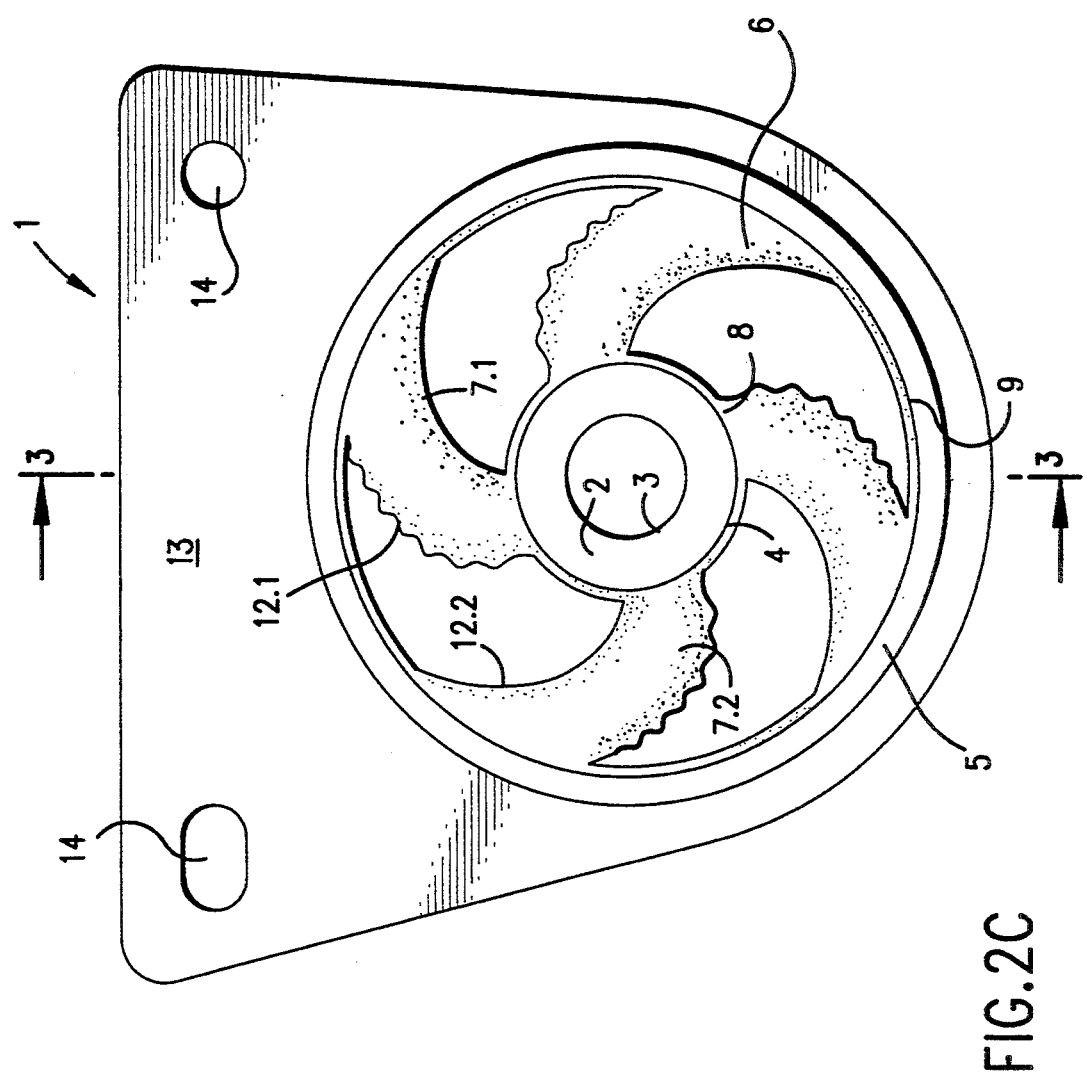
FIG. 2C shows a variation of the embodiment shown in FIG. 2A in which at least one of the facing radially directed surfaces of the web members is provided with a series of protuberances.

FIG. 2C illustrates a further embodiment in which the web members are provided with a series of protuberances, as noted above.

In an alternative embodiment, the web members 7.1, 7.2 can be strengthened, for example, with a reinforcement (not shown here), to markedly reduce manifestations of relaxation in the rubber-elastic material over a long service life.

Figure 3:
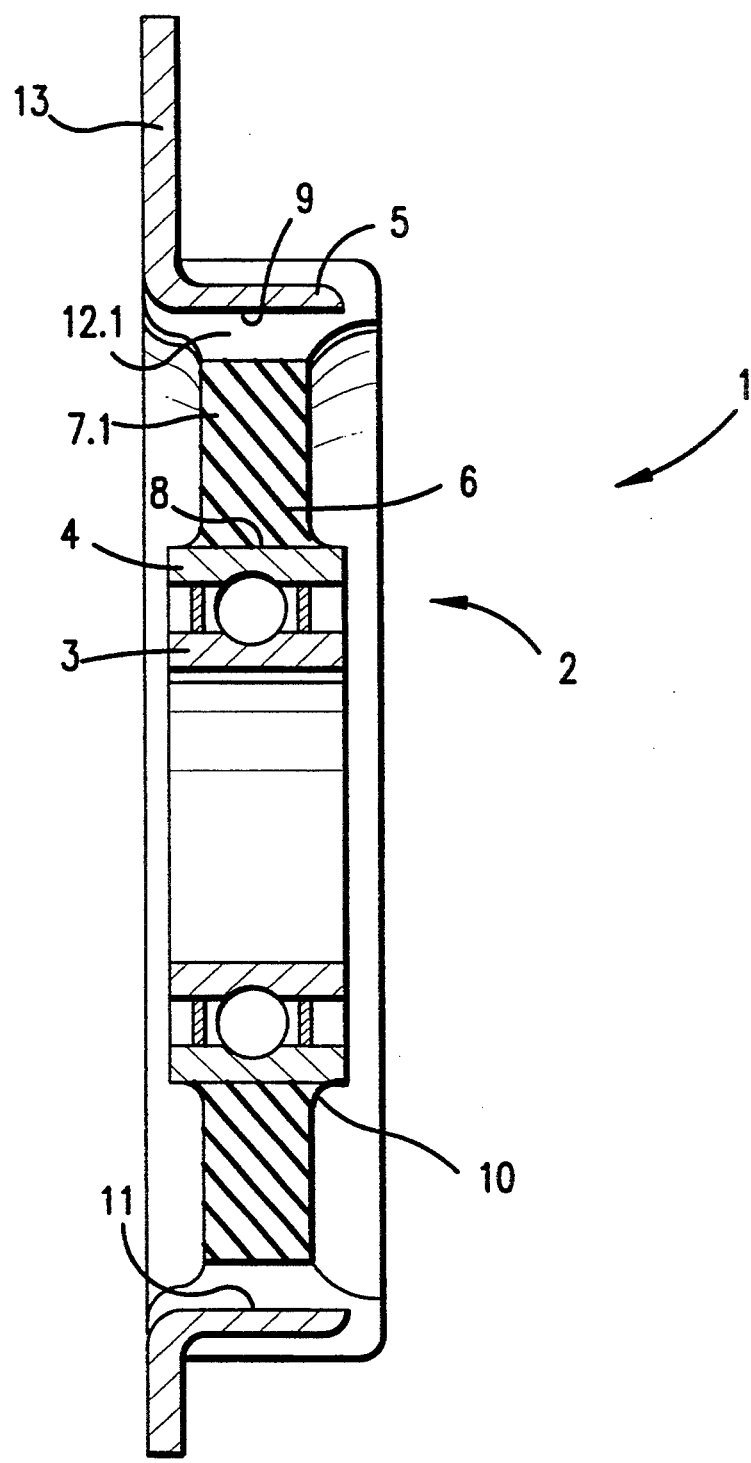
FIG. 3 shows the embodiment of FIG. 1 in a section taken along line A—A.

In FIG. 3, the embodiment of FIG. 2 is depicted along line A—A in a cut-away view. The thrust ring 5 is completely surrounded in the region of its axial side by the rubber-elastic material of the intermediate ring 6. The thrust ring 5 can have radial perforations, for example, which are penetrated by the rubber-elastic material of the intermediate ring. After interpenetrating material has hardened, the penetrations guarantee a good bonding and mechanical claw-type fixation of the two parts to one another.

In these embodiments, a sealed deep-groove ball bearing is used as a rolling-contact bearing 2 radially separating the inner ring 3 from the outer ring 4. It is equally possible for differently designed rolling-contact bearings to be used, such as roller bearings or spherical-roller bearings.

What is claimed is:

1. A single-thrust bearing, comprising:
    a rolling-contact bearing having an inner ring and an outer ring;
    a thrust ring circumferentially surrounding and radially displaced from the outer ring of the rolling-contact bearing; and
    an intermediate ring of rubber-elastic material located intermediate the thrust ring and the outer ring of the rolling-contact bearing and serving to transfer loads between the thrust ring and the outer ring, said intermediate ring being formed of at least two web members that are distributed in the circumferential direction and which are separated from each other by a circumferential clearance, wherein the web members are inclined with an involute shape in the same direction of rotation.

2. The single-thrust bearing according to claim 1, in which:
    the web members each have both a radially inner supporting surface and a radially outer supporting surface, the outer ring of the rolling contact bearing has an outer surface and the thrust ring has an inner surface; and
    the inner supporting surfaces of the web members are adhesively connected to the outer surface of the outer ring of the rolling-contact bearing, and the outer supporting surfaces of the web members are adhesively connected to the inner-surface of the thrust ring.

3. The single-thrust bearing according to claim 2, wherein the web members are configured to blend into one another in the area of their inner and outer supporting surfaces and are uniformly distributed about the rolling-contact bearing in the circumferential direction.

4. The single-thrust bearing according to claim 2, wherein the web members are delimited in the circumferential direction by mutually adjacent involute surfaces, at least one of which is provided with protuberances.

5. The single-thrust bearing according to claim 1, wherein the web members are delimited in the circumferential direction by mutually adjacent involute surfaces, at least one of which is provided with protuberances.

6. The single-thrust bearing according to claim 5, protuberances are formed as stop knobs which protrude in the direction of the opposing surface.

7. The single-thrust bearing according to claim 1, wherein the thrust ring has a generally L-shaped profile, is designed as a fastening element, and is provided with at least one fastening perforation.

8. The single-thrust bearing according to claim 1, wherein the web members are configured to blend into one another in the area of their inner and outer supporting surfaces and are uniformly distributed about the rolling-contact bearing in the circumferential direction.

9. The single-thrust bearing according to claim 8, wherein the web members are delimited in the circumferential direction by mutually adjacent involute surfaces, at least one of which is provided with protuberances.

10. The single-thrust bearing according to claim 1, wherein the circumferential clearance formed by the adjacent web members is approximately equal to the thickness of the individual web members in the circumferential direction.

11. The single-thrust bearing according to claim 10, wherein the web members are delimited in the circumferential direction by mutually adjacent involute surfaces, at least one of which is provided with protuberances.

12. A bearing, comprising:
an inner bearing having an outer support surface;
a thrust ring; and
a plurality of web members formed of a rubber-elastic material linking the outer support surface of the inner bearing with the thrust ring, said web members comprising inner surfaces, outer surfaces, and laterally displaced side surfaces, said side surfaces having the general profile of an involute.

13. The bearing of claim 12, wherein the side surfaces of the web members bear protuberances.

14. The bearing of claim 12, wherein the web members are uniformly distributed in the circumferential direction along the outer support surface of the inner bearing.

15. The bearing of claim 12, wherein the circumferential clearance formed by the adjacent web members is approximately equal to the thickness of the individual web members in the circumferential direction.

* * * * *

UNITED STATES PATENT AND TRADEMARK OFFICE
CERTIFICATE OF CORRECTION

PATENT NO. : 5,407,282
DATED : April 18, 1995
INVENTOR(S) : Bade, et al

It is certified that error appears in the above-indentified patent and that said Letters Patent is hereby corrected as shown below:

On the title page, item [54] and Col. 1, line 2, the title of the invention should read --SINGLE-THRUST BEARING--.

Signed and Sealed this

Seventeenth Day of October, 1995

Attest:

BRUCE LEHMAN

*Attesting Officer*    *Commissioner of Patents and Trademarks*